United States Patent [19]

Katzenstein

[11] Patent Number: 5,245,332

[45] Date of Patent: Sep. 14, 1993

[54] PROGRAMMABLE MEMORY FOR AN ENCODING SYSTEM

[75] Inventor: Henry S. Katzenstein, Pacific Palisades, Calif.

[73] Assignee: Iedsco Oy, Oulu, Finland

[21] Appl. No.: 550,964

[22] Filed: Jul. 11, 1990

Related U.S. Application Data

[63] Continuation of Ser. No. 209,865, Jun. 22, 1988, abandoned.

[51] Int. Cl.$^5$ ............................................. H04B 7/00
[52] U.S. Cl. .............................. 340/825.54; 342/44; 342/51
[58] Field of Search ............... 340/825.54, 825.71, 340/825.72, 825.73, 539, 572, 573; 375/45, 46, 47, 48, 49, 50, 25; 342/44, 51

[56] References Cited

U.S. PATENT DOCUMENTS

| | | | |
|---|---|---|---|
| 4,618,861 | 10/1986 | Gettens | 340/573 |
| 4,631,708 | 12/1986 | Wood et al. | 340/825.54 |
| 4,742,470 | 5/1988 | Juengel | 340/825.72 |
| 4,752,776 | 6/1988 | Katzenstein | 340/825.54 |
| 4,818,855 | 4/1989 | Morgeon et al. | 340/825.54 |
| 4,827,395 | 5/1989 | Anders et al. | 340/825.54 |
| 4,857,893 | 8/1989 | Carroll | 340/825.54 |
| 4,955,038 | 9/1990 | Lee et al. | 340/825.54 |

Primary Examiner—Donald J. Yusko
Assistant Examiner—Dervis Magistre
Attorney, Agent, or Firm—Ellsworth R. Roston; Charles H. Schwartz

[57] ABSTRACT

A reader transmits a pulse to a transponder. The transponder responds by transmitting a particular number (e.g. 10) of signals at a frequency dependent upon the identifying code recorded in the transponder. The reader then transmits a pulse of an opposite polarity to that previously transmitted. The transponder responds by generating 10 signals at a second frequency different from the first frequency. In this way, sequences of pulses alternatively of opposite polarity are transmitted by the reader and sequences of signals at the first and second frequencies are transmitted by the transponder. The reader decodes the sequences of signals at the first and second frequencies, in accordance with the order of the frequencies of such signals, to identify the code at the transponder. The transponder may have a programmable memory to store the code. To program the memory with such a code, the reader transmits sequences of pulses, each sequence coding for a programmable item of information (e.g. binary "1", binary "0" and reset). Depending upon the individual programmable item, the coded sequences may have pulses of the same polarity or of opposite polarity. At a time related to each such sequence, the reader produces a sequence different from the coded sequence to indicate that pulses coding for a programmable item follow. The transponder decodes the transmitted pulses to recover the identifying code. This code is recorded in the programmable memory and is used to identify the transponder when the reader interrogates the transponder as described above.

38 Claims, 6 Drawing Sheets

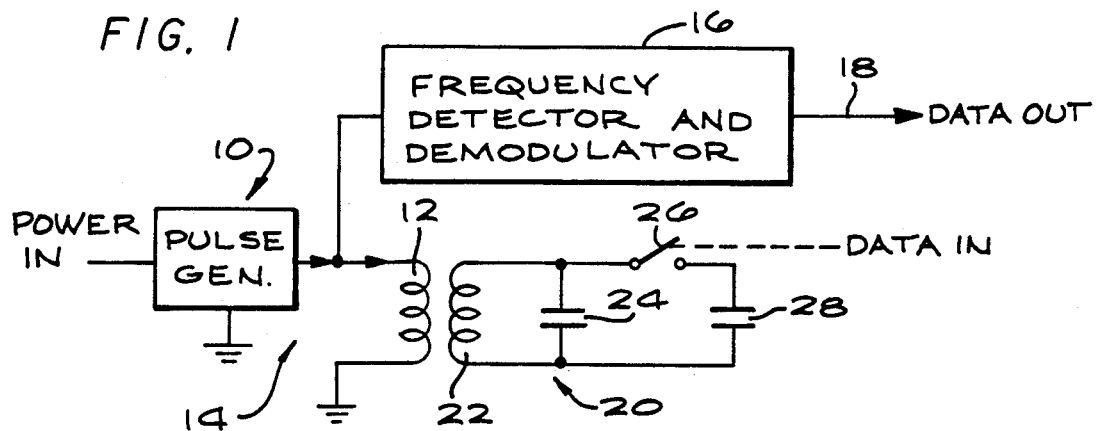
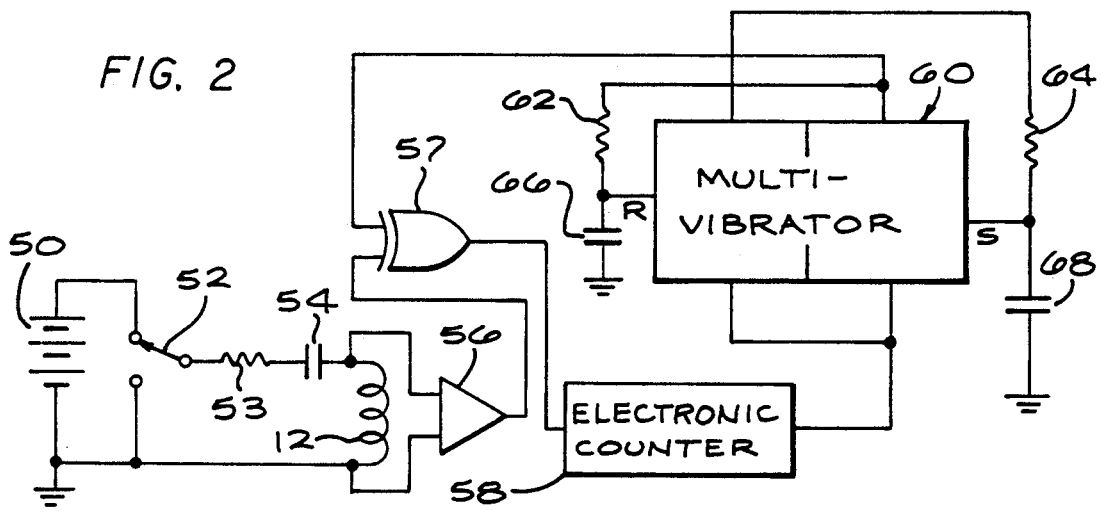
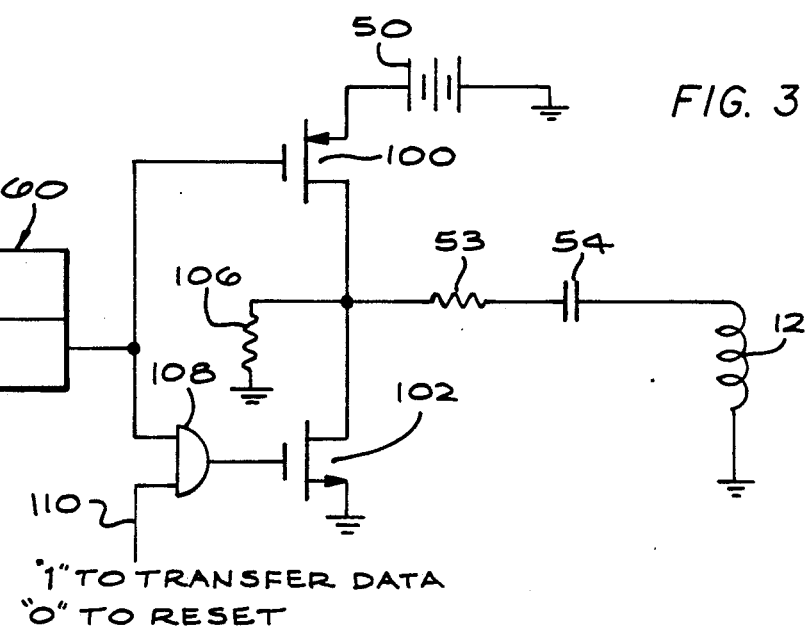

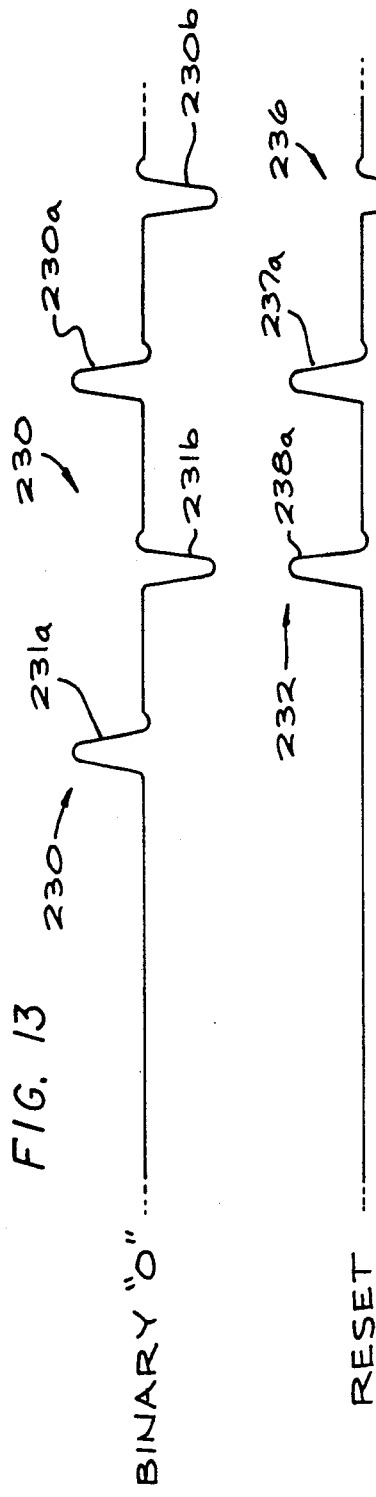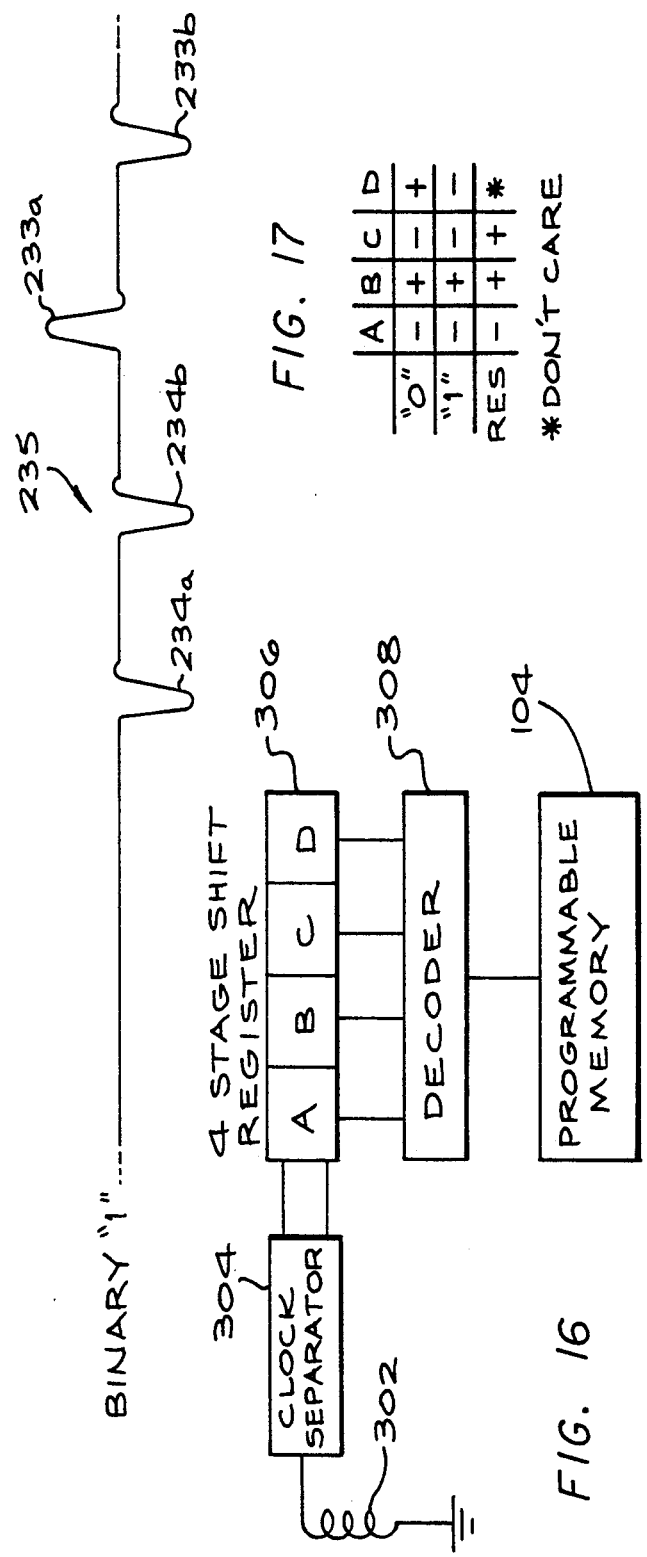

PROGRAMMABLE MEMORY FOR AN ENCODING SYSTEM

This is a continuation of application Ser. No. 209,865 filed Jun. 22, 1988 now abandoned.

BACKGROUND OF INVENTION

This invention relates to a system which includes a reader and a transponder displaced from the reader for identifying the transponder to the reader in accordance with a code individual to the transponder and transmitted to the reader at the command of the reader. The system is able to provide such identification without interference from extraneous noise, even at high levels, or small obstacles in the path of data transmission between the transponder and the reader. More particularly, the invention relates to a system for initially transmitting an identifying code from the reader to the transponder and programming this code into the transponder to identify the transponder.

As our society becomes increasingly complex, it becomes increasingly important to be able to identify different objects. For example, in an aircraft plant for manufacturing a jet airplane, thousands, and even tens of thousands, of different tools are required to manufacture the different parts incorporated into the airplane. It is accordingly important to be able to identify the individual tools quickly and reliably. One reason is that a fast and reliable identification of each individual tool is cost-efficient because it minimizes the time needed to identify such tool. Another reason is that a fast and reliable identification of each individual tool minimizes the possibility that the wrong tool will be selected and used on a workpiece, thereby causing the workpiece to be ruined or damaged.

It has been known for an extended period of time that it would be desirable to provide a system for obtaining a fast and reliable indication of objects such as tools. An extensive effort has accordingly been made by a wide variety of different parties to provide a satisfactory system. Such efforts have not been productive for a number of reasons. As a result, a satisfactory system still does not exist for identifying objects such as tools.

The systems now in use are undesirable for a number of reasons. They are not fast. For example, some of the systems use a transponder which stores energy received from a displaced reader and which then generates a code after such storage of energy. The energy is stored by charging a capacitance at the transponder. Other systems sweep a range of frequencies and detect the perturbations produced at individual frequencies in such frequency range. As will be appreciated, both types of systems are relatively slow.

The systems now in use have other severe limitations. The systems are not self synchronous. In other words, the systems do not operate on the basis of clock signals internally generated in the system. As a result, the systems sometimes provide the reader with false and inaccurate indications of the code identifying the object at the transponder. This causes an improper object to be identified sometimes at the reader.

The systems now in use also have other critical limitations. For example, the systems now in use are sometimes responsive to extraneous signals. Furthermore, in the systems now in use, members in the path between the transponder and the reader sometimes block the reception by the reader of the identifying signals transmitted by the transponder. This blockage has occurred even when the members in the path are relatively small. These problems have been exacerbated by the fact that the systems now in use are not self-synchronous. This has caused the systems now in use to identify objects improperly.

The systems now in use are also relatively complicated. This has caused the systems now in use to be excessively large from the standpoint of the space occupied by such systems. It has also prevented the systems now in use from taking advantage of integrated circuit technology. For example, it would be desirable to dispose the transponder on a single integrated circuit chip and to dispose all, or at least substantially all, of the reader components on another integrated circuit chip.

Co-pending application Ser. No. 840,318 relating to an "Identification System" filed by me on Mar. 14, 1986, now U.S. Pat. No. 4,752,776 and assigned for record to the assignee of record in this application discloses and claims a system which overcomes the above disadvantages. The system is fast, accurate and reliable. It operates on a self-synchronous and passive basis. It is immune to extraneous signals and it is effective even when small members are disposed between the transponder and the reader. It is simple and compact such that the transponder is disposed on a single integrated circuit chip and all, or substantially all, of the reader circuit is disposed on another single integrated circuit chip. It is quite tolerant of variations in the values of components so that it can be produced economically in quantity.

In one embodiment of the system disclosed and claimed in co-pending application Ser. No. 840,318, a reader (which can also be considered to be an interrogator) identifies information, such as the identity of an object at a transponder, provided in binary form at the transponder. The reader initially generates a pulse which activates the transponder into transmitting a series of signals, such as by magnetic induction, to the reader. Upon each count of a particular number of signals in the reader, the reader generates a new pulse which causes the transponder to produce a new series of signals. The generation of the pulses by the reader may occur through the charge. and discharge of energy in a storage member such as a capacitance.

The series of signals produced by the transponder in co-pending application Ser. No. 840,318, U.S. Pat. No. 4,752,776, may have erther a first frequency or second frequency. The signals may be generated at the first and second frequencies in each sequence in an order dependent upon (a) the binary code provided at the transponder and (b) the polarity of the pulse produced by the reader in such sequence. The signals may be generated at the second frequency by connecting a capacitance across a coupling coil at the transponder. The reader then identifies the information by demodulating the signals received by it at the first and second frequencies.

The reader in co-pending application Ser. No. 840,318 is able to interrupt at any time the generation of the sequences of signals at the transponder when it does not receive the signals transmitted by the transponder. The reader then operates on a free running basis to generate pulses of opposite polarity at a relatively low frequency. In this way, the reader is constantly prepared to activate the transponder when the transponder becomes subsequently disposed within the effective range of the reader.

The memory storing the code in the transponder may be programmable. This invention provides a system operable at the reader for programming a binary code into such memory from the reader to constitute the binary information thereafter identifying the object. The code is transmitted from the reader to the object by sequences of pulses similar to the pulses described above as being transmitted from the reader to the transponder to interrogate the transponder as to the code in the transponder.

To program the memory with such a code, the reader in this invention generates, and transmits to the transponder, sequences of pulses, each sequence coding for a programmable item of information (e.g. binary "1", binary "0" and reset). Depending upon the individual programmable item, the coded sequence may have pulses of the same polarity or pulses of opposite polarity At a time related to each each such sequence, the reader produces a sequence different from the coded sequence and indicating that pulses coding for a programmable item follow.

The transponder in this invention demodulates and decodes the transmitted pulses to to recover the identifying code. This code is then recorded in the programmable memory and is used thereafter to identify the transponder when the reader interrogates the transponder as described above.

BRIEF DESCRIPTION OF THE DRAWINGS

FIG. 1 is a simplified block diagram of a system constituting one embodiment of this invention for generating at a transponder information such as the identification of an object, transmitting this information to a reader and identifying the information at the reader;

FIG. 2 is a circuit diagram, partly in block form, of the reader included in the system shown in FIG. 1;

FIG. 3 is a circuit diagram schematically illustrating the construction of additional features in the reader shown in FIG. 1;

FIG. 13 illustrates sequences of signals for programming individual items (e.g. binary "1", binary "0" and reset) in the programmable memory in the transponder);

FIG. 16 is a circuit diagram, partially in block form, schematically illustrating a system at the transponder for demodulating and then decoding the programmable pulses received at the transponder and for recording the decoded information in the memory in the transponder; and FIG. 17 is a table illustrating the operation of the transponder of FIG. 16 in responding to the programmable pulses to record the decoded information in the memory in the transponder.

DETAILED DESCRIPTION OF DRAWINGS

Figure 4:
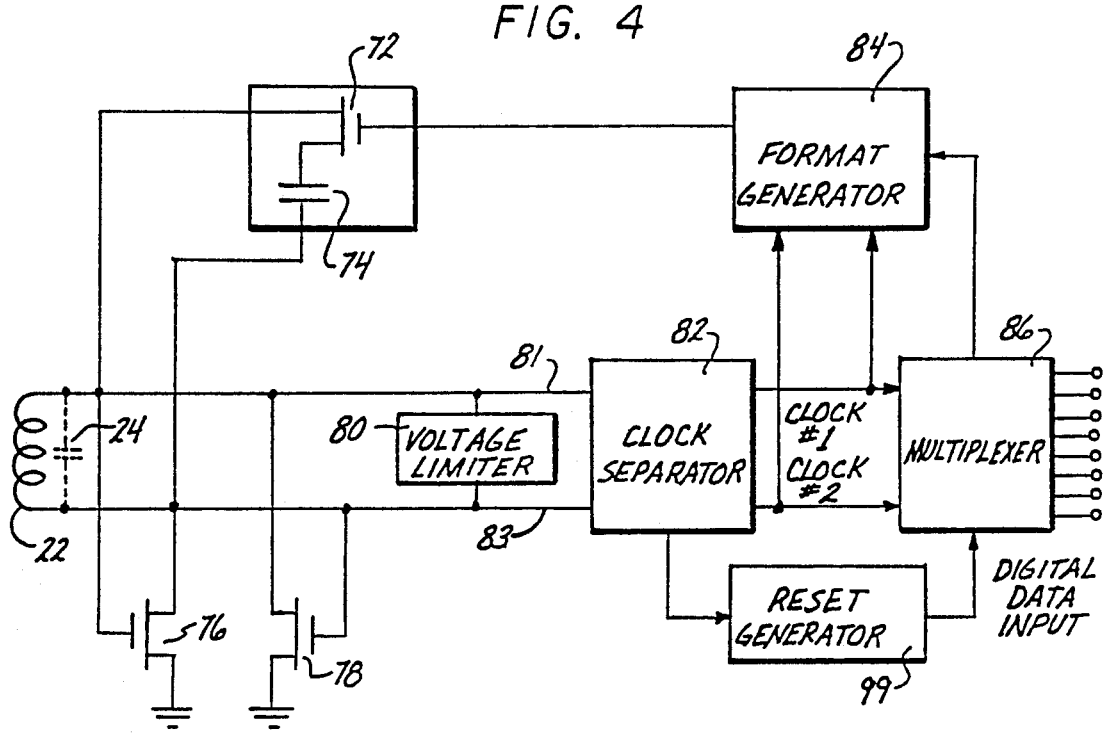
FIG. 4 is a circuit diagram, partly in block form, of the transponder included in the system shown in FIG. 1.

FIG. 1 shows a simplified diagram of one embodiment of a system constituting this invention. The embodiment shown in FIG. 1 includes a pulse generator 10 connected to a coil 12 at a reader generally indicated at 14. A frequency detector and demodulator 16 is coupled to the coil 12 and output indications from the frequency detector and demodulator are introduced to a line 18. A transponder generally indicated at 20 includes a coil 22 magnetically coupled to the coil 12. A capacitance 24 exists across the coil 22. A switch 26 and a capacitance 28 are also connected in series across the coil 22. The system shown in FIG. 1 and further shown in FIGS. 2-6 is fully disclosed and claimed in co-pending application Ser. No. 840,318 (now U.S. Pat. No. 4,752,776).

The coils 12 and 22 are constructed so that they are magnetically coupled to each other through a finite distance. This distance may be in the order of a few milliinches to a few feet. The coils 12 and 22 are further constructed so that they will not be responsive to magnetic signals extraneous to those generated by the coils 12 and 22.

Figure 8:
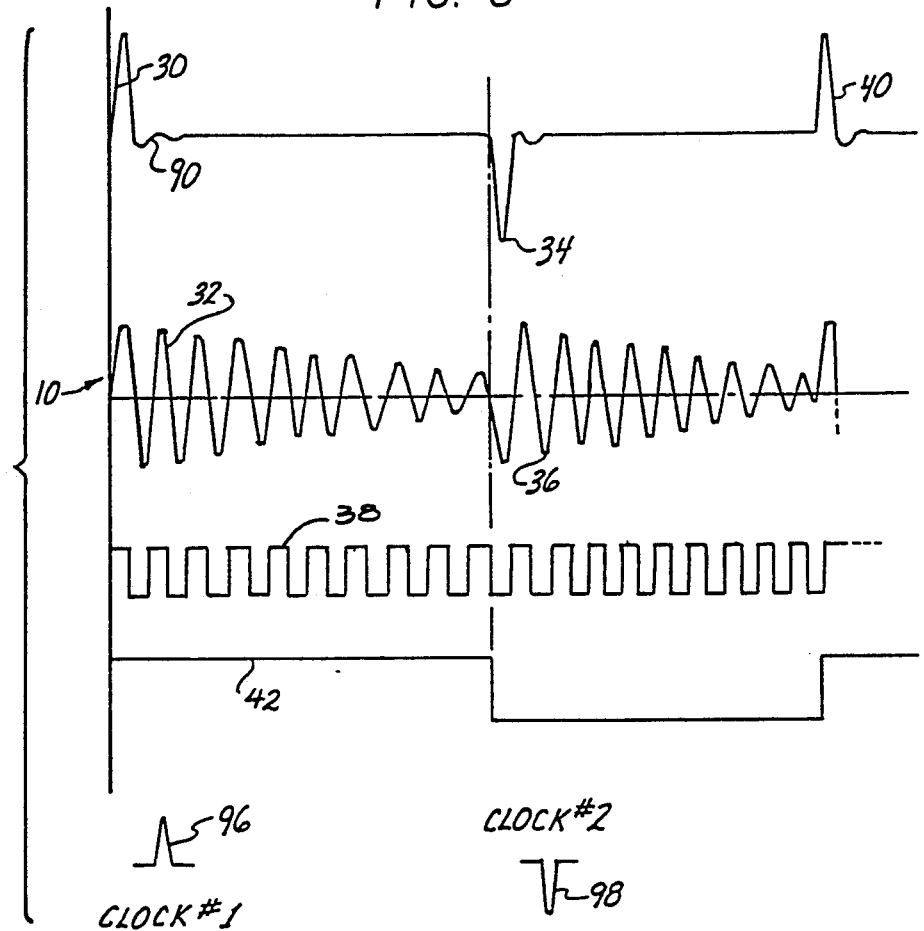
FIG. 8 illustrates wave forms of signals generated by the reader and the transponder.

To initiate the operation of the system shown in FIG. 1, the pulse generator produces a pulse indicated at 30 in FIG. 8. This pulse is coupled as by magnetic induction through the coil 12 to the coil 22 which produces a plurality of signals 32. These signals are limited in amplitude to produce signals 38 having rectangular characteristics. When the switch 26 is open, the coil 22 and the capacitance 24 form a resonant circuit which causes the signals 32 to have a first frequency such as three (3) megahertz. However, when the switch 26 becomes closed, the capacitance 28 becomes connected in parallel with each of the coil 22 and the capacitance 24. As a result, the signals generated by the transponder 20 have a second frequency such as two (2) megahertz.

The information, such as the identification of the object, is transmitted in the form of a binary code constituting a plurality of bits each represented by a binary "1" or a binary "0" For each binary bit, a sequence of signals at both the first and second frequencies is generated at the transponder 20. The order of generating the signals at the first and second frequencies in each sequence relative to the pulses such as the pulse 30 is dependent, at least in part, on the value of the binary bit being identified in that sequence.

The signals, such as the signals 32, generated in each plurality are magnetically coupled by the coil 22 to the coil 12 as by magnetic induction. The reader 14 then counts these signals. When the count reaches a particular value such as ten (10), the pulse generator 10 in FIG. 1 generates a new pulse such as that indicated at 34 in FIG. 8. This pulse has a polarity opposite to that of the pulse 30. This causes a plurality of signals, such as those indicated at 36 in FIG. 8 to be produced. The signals 36 correspond to the signals 32 except that they have a frequency different from the frequency of the signals 32. For example, the signals 36 have the second frequency if the signals 32 have the first frequency. Similarly, the signals 36 have the first frequency if the signals 32 have the second frequency.

The signals 36 are then transmitted to the reader 14 and are counted at the reader. When the count reaches the particular value such as ten (10), the pulse generator 10 generates a pulse 40 (FIG. 8) in the coil 12. This pulse has the same polarity as te pulse 30. The generation of the pulse 40 causes the transponder 20 to generate a plurality of signals at one of the first and second frequencies. In this way, the reader 14 and the transponder 20 interact to provide for the generation of pulses, such as the pulses 30, 34 and 40, at the reader 14 and the generation of a plurality of signals at the transponder 20 in response to each of these pulses.

As will be appreciated, each sequence of signals is formed from a particular number (such as ten (10)) of signals at the first frequency and the particular number of signals at the second frequency. This means that the time required to produce each of the successive sequences is constant. In each sequence, the particular order of the signals at the first frequency and the signals at the second frequency controls the value of the binary bit represented by the sequence. This order is determined by the frequency detector 16 which demodulates the signals produced in the coil 12 at the first and second frequencies. The demodulated signal is indicated at 42 in FIG. 8. As will be seen, the demodulated signal in each sequence has two time portions of unequal duration. The duration of the time portion corresponding to the signals at the first frequency (e.g. 3 megahertz) is shorter than the duration of the time portion corresponding to the signals at the second frequency (e.g. 2 megahertz).

FIG. 2 indicates additional details of the reader 14 shown in FIG. 1. The reader 14 shown in FIG. 2 includes a power source 50, such as a battery, constructed to provide a direct voltage. One terminal of the power source 50 may be connected to a reference potential such as ground. The stationary contacts of a switch 52 are connected to the opposite terminals of the power source 50. A connection is made from the movable arm of the switch 52 through a resistance 53 to one terminal of a capacitance 54. Although the switch 52 is shown as being mechanical, it will be appreciated that the switch 52 may be formed from electronic components such as semi-conductors, as will be seen in FIG. 3.

The coil 12 is connected in FIG. 2 between the second terminal of the capacitance 54 and the grounded terminal of the power source 50. The coil 12 and the resistance 53 may be constructed to damp any pulses, following the pulses, such as the pulses 30, 34 and 40, produced in the coil 12. The coil 12 is also constructed to direct to the coil 22 magnetic flux produced in the coil 12 with a minimal leakage of flux in any other direction than in the direction toward the coil 22. By limiting the leakage of flux from the coil 12 to occur substantially only in a direction toward the coil 22, the coil 12 is substantially immune to stray magnetic fields. The coil 12 is also "immune" to interaction with magnetic or electrically conductive material which is not disposed in the path of the flu produced by the coil.

The two terminals of the coil 12 are connected to input terminals of a limiting amplifier 56. The output signals from the amplifier 56 are introduced to one input terminal of an "exclusive or" network 57, another input terminal of which receives signals from an output terminal of an astable multivibrator generally indicated at 60. The output signals from the "exclusive or" network 57 pass to the input terminal of a counter 58, the output from which passes to the input terminals of the clocked astable multivibrator 60. The multivibrator 60 has two (2) substantially identical inputs and a clock input, one of the identical inputs may be designated as a "set" input ("S") and the other of such identical inputs may be designated as a "reset" input ("R"). The signals introduced to each input in the multivibrator 60 control the operation of an associated stage in the multivibrator.

First terminals of resistances 62 and 64 are respectively connected from the output terminal of each stage in the multivibrator 60 to the input terminal of the other stage in the multivibrator. Connections are respectively made from the second terminals of the resistances 62 and 64 to first terminals of capacitances 66 and 68, second terminals of which receive the reference potential such as ground. The signals on the output terminals of the two stages in the multivibrator control the position of the movable arm of the switch 52. The movable arm of the switch 52 is moved alternately upwardly and downwardly in accordance with the signals produced on the output terminals of the two stages in the multivibrator 60.

The transponder 20 is shown in additional detail in FIG. 4. It includes the coil 22 which is also shown in FIG. 1. The capacitance 24 (also shown in FIG. 1) is shown in broken lines as being connected across the coil 22. The capacitance is shown in broken lines because it may be considered to be formed from distributed capacitances in thecoil 22 and in other elements in the circuitry shown in FIG. 4. If necessary, a discrete capacitance can be connected across the coil 22 and can be considered to be included in the distributed capacitance 24. The coil 22 and the capacitance 24 form a circuit which is resonant at the first frequency such as three (3) megahertz. This resonant circuit generates signals on a ringing basis in response to each pulse from the coil 12.

The drain of a transistor 72 is connected to a first terminal of the coil 22 and the source of the transistor 72 is connected to one terminal of a capacitance 74, the other terminal of which is common to the second terminal of the coil 22. The first terminal of the coil 22 is also common with the gate of a transistor 76 and the drain of a transistor 78. Connections are made from the second terminal of the coil 22 to the drain of the transistor 76 and the gate of the transistor 78. The sources of the transistors 74 and 76 are common with the reference potential such as ground. The transistors 74 and 76 may be field effect transistors.

A voltage limiter 80 is connected across the coil 22. The signals from the voltage limiter 80 are respectively introduced through lines 81 and 83 to the two (2) input terminals of a clock separator 82. The clock separator 82 has a first output alternately providing firtt clock signals representing a positive polarity in the excitation pulses such as the pulses 30, 34 and 40 and has a second output alternately producing second signals representing a negative polarity in such excitation pulses. The signals from the clock separator 82 are introduced to input terminals of a format generator 84 and a multiplexer 86. The output from the format generator 84 is introduced to the gate of the transistor 72. The format generator 84 also receives input signals from the multiplexer 86. Binary input information identifying the object to be identified may be introduced to input terminals of the multiplexer 86 and may be stored in the multiplexer. In this way, the multiplexer 86 may be considered to constitute a read-only memory.

When the movable arm of the switch 52 in FIG. 2 engages the upper stationary contact of the switch as shown in FIG. 2, a circuit is established which includes the power source 50, the switch 52, the resistance 53, the capacitance 54 and the coil 12. This causes a surge of current to flow through the coil 12 to produce the pulse 30. The pulse is considerably damped, as indicated at 90 in FIG. 8, because of the construction of the coil 12 and the inclusion of the resistance 53.

The generation of the pulse 30 in the coil 12 causes the signals 32 to be produced in the transponder 20. These signals, in turn, cause signals to be coupled magnetically back into the coil 12. These signals are limited in amplitude by the amplifier 56 and are then introduced through the "exclusive or" network 57 to the counter 58. When the count in the counter 58 reaches a particular value such as ten (10), the counter produces a signal to trigger the multivibrator 60 from one state of operation to the other. This causes a signal to be introduced to the switch 52 to actuate the movable arm of the switch from engagement with the upper stationary contact of the switch to engagement with the lower stationary contact of the switch.

When the movable arm of the switch 52 engages the lower stationary contact of the switch, the capacitance 54 becomes discharged through a circuit including the capacitance, the coil 12, the switch 52 and the resistance 53. As will be seen, the current through the coil 12, as a result of the discharge of the capacitance 54, is in an opposite direction from the current flowing through the coil 12 as a result of a charging of the capacitance. The pulse 34 generated in the coil 12 as a result of the discharge of the capacitance 54 accordingly has a polarity opposite to the polarity of the pulse 30. In this way, the pulses generated by the coil 12 alternately have one polarity and then the opposite polarity. This is indicated in FIG. 8 by a positive polarity for the pulses 30 and 40 and a negative polarity for the pulse 34.

The transponder 20 produces a pulse, as by magnetic induction, corresponding to each of the pulses, such as the pulses 30, 34 and 40, produced in the reader 14. As previously discussed, the transponder 20 also generates a plurality of signals every time that the reader 14 generates a pulse such as the pulse 30 or the pulse 34. Since the successive pulses such as the pulses 30 and 34 have opposite polarities, the pluralities of signals, such as the signals 32 and the signals 36, generated by the transponder 20 also have opposite polarities.

The transistor 78 in FIG. 4 operates to pass to ground the negative swings of the signals produced on the upper terminal of the coil 22 in FIG. 4 so that only the positive swings of these signals pass to the voltage limiter 80 through the line 81. In like manner, the transistor 76 operates to ground the negative portions of the signals produced on the lower terminal of the coil 22 in FIG. 4 so that only the positive swings of such signals pass to the voltage limiter 80 through the line 83.

The amplitudes of the signals introduced to the voltage limiter 80 are limited to produce signals such as the signals 38 in FIG. 8 and are then introduced to the clock separator 82. The clock separator 82 determines the polarity of the reader pulse associated with each plurality of the signals produced in the coil 22, such as the signals 32 or the signals 36, and generates a clock signal on a particular one of its outputs in synchronism with the occurrence of such pulse. As will be seen, each successive clock signal coincides in time with the pulse from the coil 22 and the polarity of this pulse is opposite to the polarity of the previous pulse since the pulses 30, 34 and 40 have alternate polarities. Clock signals, such as a clock signal 96 in FIG. 8, coincident in time with a positive polarity in the pulse from the coil 22 are introduced from one output line of the clock separator 82 to the format generator 84. Clock signals, such as a clock signal 98 in FIG. 8, coincident in time with a negative polarity in the pulse from the coil 22 are introduced from the other output line of th clock generator 82 to the format generator 84.

In addition to receiving the clock signals from the clock separator 82, the format generator 84 also receives signals from the multiplexer 86. The multiplexer 86 stores a plurality of binary signals each having first and second logic levels respectively coding for a binary "1" and a binary "0". The binary signals in the plurality have a unique code to identify each individual object. For example, the code may have a pattern such as 011010110101 to identify an individual tool from thousands of other tools, the least significant bit in the plurality being at the right.

The successive bits of information stored in the multiplexer 86 are introduced by the multiplexer to the format generator 84 in synchronism with the clock signals of a particular polarity from the clock separator 82. For example, when the first pulse in each sequence, such as the pulse 30 or the pulse 40, has a positive polarity, the next bit in the code from the multiplexer 86 is introduced to the format generator 84 upon the generation of a pulse of positive polarity in the coil 12. Since the multiplexer 86 operates at the beginning of each sequence to shift into the format generator 84 the next bit of the code identifying the object, the multiplexer 86 operates, in effect, as a shift register.

Figures 5, 6, 7:
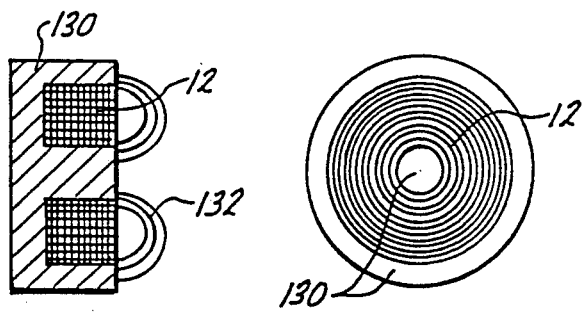
FIG. 5 is a sectional view, in front elevation, illustrating the construction of one of the members, including cores and coils with magnetic properties, which are included in the reader and transponder to provide a magnetic coupling between the reader and the transponder.
FIG. 6 is a view in side elevation of the magnetic member shown in FIG. 5.
FIG. 7 is one form of truth table illustrating the operation of a format generator included in the transponder shown in FIG. 4.

The format generator 84 produces signals in accordance with the truth table illustrated in FIG. 7. Under certain sets of conditions as specified in the truth table, the format generator 84 generates a signal which causes the transistor switch 72 to become opened (or non-conductive). This will cause the coil 22 to generate signals at the first frequency such as three (3) megahertz. Under other sets of conditions as specified in the truth table, the format generator 84 will generate a signal which will cause the transistor switch 72 to become closed (or conductive). This will connect the capacitance 74 across the coil 22. As a result, the coil 22 will generate signals at the second frequency such as two (2) megahertz.

FIG. 7 illustrates one form of a truth table to show how the format generator 84 responds to the polarity of the clock signals from the clock separator 82 and the binary bits of information from the multiplexer 86 to determine the order in which the signals are generated at the first and second frequencies in each sequence. For example, as indicated in FIG. 7, when a binary "1" is provided by the multiplexer 86 and the polarity of the first clock signal in each sequence is positive, the format generator 84 initially opens the switch 72 in the sequence for times following a positive clock signal. This is indicated by the letter "O" in FIG. 7 to show that the switch 72 is initially opened in the sequence. This causes the signals at the first frequency to be generated in the sequence before the signals at the second frequency are generated in the sequence. Similarly, if a binary "0" is to be generated in a sequence and the polarity of the first clock signal in the sequence is negative, the switch 72 is initially opened in the sequence and is subsequently closed in the sequence. This is indicated by the letter "O" in FIG. 7 for this set of conditions. In FIG. 7, the letter "C" for a set of conditions indicates that the switch 72 is initially closed in a sequence and is then opened in the sequence.

As previously described, the successive pluralities of signals generated by the transponder 20 are received by the reader 14. These signals are demodulated by the frequency detector and demodulator 16 and the demodulated signals are introduced to the line 18. The pattern of the binary 1's and binary 0's in the multiplexer 86 can accordingly be detected by determining the relative time duration of the positive and negative portions of the demodulated signals in each sequence and the polarity of the pulses such as the pulses 30 and 40 at the beginning of each sequence. In effect, the truth table shown in FIG. 7 is reconstructed.

Figure 9:
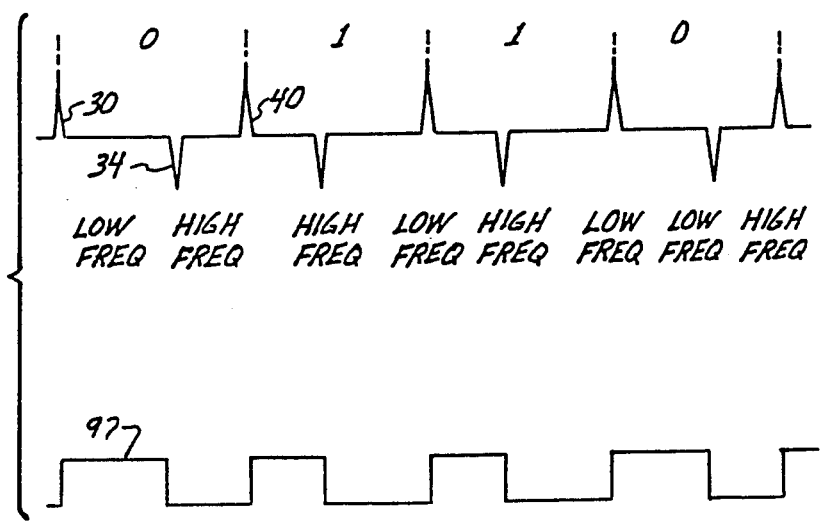
FIG. 9 illustrates the characteristics of signals generated in the reader.

The demodulated signals (also shown at 42 in FIG. 8 for one sequence) are illustrated at 97 in FIG. 9 in relation to the excitation pulses such as the pulses 30, 34 and 40. The detection by the frequency detector and demodulator 16 of the pattern of the binary 1's and binary 0's in the multiplexer 86 facilitated by the fact that the duration of time between successive pulses of the same polarity, such as the pulses 30 and 40, is substantially constant regardless of the order in which the signals at the first and second frequencies is generated. For example, the sum of the duration of time between the pulses 30 and 34 and between the pulse 34 and the successive pulse 40 (all constituting one sequence) is equal to the sums of the duration of time between the initial pulses in successive sequences.

It may sometimes happen that the magnetic coupling between the coil 12 in the reader 14 and the coil 22 in the transponder 20 may be interrupted in the middle of the generation of the sequences of signals to identify the object associated with the transponder. This may occur for several reasons. For example, the transponder 20 may be moved out of the effective range of the reader 14 or a member of relatively large size may be disposed between the reader and the transponder to block any magnetic induction between the reader and the transponder. The circuitry shown in FIG. 3 is included in the reader 14 to operate under such circumstances. The circuitry shown in FIG. 3 includes a resistance 106, the resistance 53, the capacitance 54 and the coil 12 shown in FIG. 2.

The system shown in FIG. 3 also includes a pair of transistors 100 and 102 which may collectively comprise the switch 52. The transistor 100 may comprise a p-channel field effect transistor and the transistor 102 may comprise an n-channel field effect transistor. The source of the p-channel transistor 100 is connected to the power source 50. The drain of the transistor 100 and the drain of the transistor 102 have common connections with the resistance 53 and with one terminal of the resistance 106, the other terminal of which receives the reference potential such as ground. The source of the transistor 102 also receives the reference potential such as ground.

A connection is made from the gate of the transistor 100 to the output terminal of one stage in the astable multivibrator 60. The gate of the transistor 102 receives the output signals from an "and" gate 108. One input terminal of the "and" gate 108 receives the voltage on the same output terminal of the multivibrator 60 as introduces signals to the gate of the transister 100. A second input terminal of the "and" gate 108 receives signals produced on a line 110.

When a signal having a logic level representing a binary "1" is produced on the line 110, the system described above operates to detect at the reader 14 the binary code provided in the multiplexer 86 at the transponder 20. However, when the generation of the sequences of signals from the transponder 20 to the reader 14 is interrupted as by an interruption in the magnetic coupling between the coils 12 and 22, the multivibrator 60 starts to operate on a free running basis at a relatively low frequency. For example, when the signal on the output line from the multivibrator 60 is low, the transistor 100 becomes conductive. This causes a current to flow through a circuit including the voltage source 50, the transistor 100, the resistance 53, the capacitance 54 and the coil 12. This current charges the capacitance 54.

After the capacitance 54 has become charged, it discharges slowly through a circuit including the capacitance, the resistance 53, the resistance 106 and the coil 12. When the signal on the output line from the multivibrator 60 becomes high, this signal passes through the "and" gate 108 and causes the transistor 102 to become conductive. The remaining charge in the capacitance 54 is then discharged through a circuit including the capacitor, the resistance 53, the transistor 102 and the coil 12. In this way, the multivibrator 60 operates on a free running basis at a relatively low frequency. This causes the coil 12 to generate pulses at the relatively low frequency to activate the transponder 20 when the transponder is moved relative to the reader within magnetically inductive range relative to the reader 14.

It may sometimes be desired to interrupt the dialog between the reader 14 and the transponder 20 while the reader and the transponder ar in the middle of this dialog. To provide such an interruption, a signal having a logic level of "0" is produced on the line 110. This inactivates the "and" gate 108. This causes the charge produced in the capacitance 54 to discharge slowly through the circuit including the capacitance 12, the resistances 53 and 106 and. Because of this slow discharge, negative pulses corresponding to the pulse 34 in FIG. 8 are not produced in the coils 12 and 22.

A reset generator 99 is connected between the clock separator 82 and the multiplexer 86 in FIG. 4. The reset generator 99 is responsive to the production of clock signals of alternate polarity by the clock separator 82. Thus, when a negative pulse such as the pulse 34 is not generated by the coils 12 and 22 for a particular period of time such as a period greater than the period between the pulses 30 and 40 (but less than twice this period), the reset generator 99 operates to reset the multiplexer 86. In this way, a new operation in identifying the object individual to the code in the multiplexer 86 can be initiated.

The coil 12 produces a pulse every time that the capacitance 54 charges or discharges through the coil as discussed in the previous paragraph. These pulses interrogate the area within the effective range of the coil 12.

If there is any transponder within this area and the coil 12 in the reader 14 points toward this transponder, an electronic dialog is instituted between the reader and such transponder, as discussed in detail above, to determine the identity of the object at such transponder. In this way, by producing pulses at a relatively low frequency as discussed above, the circuitry shown in FIG. 4 is ready at any instant to initiate an identification of the object at the transponder 14 in accordance with the unique code provided in the multiplexer 86. This identification is initiated by providing on the line 110 a signal having a logic level coding for a binary "1".

FIGS. 5 and 6 illustrate the construction of the magnetic members, including the coil 12, at the reader 14. A similar construction may be provided for the magnetic members, including the coil 22, at the transponder 20. At the reader 14, the coil 12 is wound on a core 130 having an E-shape in section. The coil 12 is disposed on the middle leg of the core 130 and is shielded within the end legs. In this way, when the coil 12 is energized, it produces leakage flux indicated at 132 in FIG. 5. This leakage flux extends from the core 130 in a controlled direction. This leakage flux is magnetically coupled to the coil 22 at the transponder 20 to induce signals in the coil 22 when the coil 22 at th transponder is within the effective range of the coil 12 at the reader 14.

The reader coil 12 is included in a circuit which includes the resistance 53. This causes the pulses, such as the pulses 32 and 36, produced in the coil 22 to be damped. On the other hand, the coil 22 is connected in a resonant circuit which includes the capacitance 24 (and an additional capacitance if necessary) to generate the signals at the first frequency and which includes the capacitances 24 and 74 to generate the signals at the second frequency. Furthermore, the signals produced by the coil 22 are not damped by any added resistance. The coil 22 is also loosely coupled to the coil 12. For these reasons, the coil 22 is able to generate a plurality of signals every time that the coil 12 generates a pulse.

The system described above is self synchronous. This results from the fact that the reader 14 produces clock signals, such as the clock signals 96 and 98 in FIG. 8, at a particular time in each of the pluralities of signals generated by the coil 22. It also results from the fact that each sequence of signals generated at the first and second frequencies has the same time duration It also results from the fact that the coil 12 responds to the signals produced in the coil 22 to produce a new pulse after each particular count of such signals and that the coil 22 responds to each pulse generated by the coil 12 to generate the plurality of signals. The system is accordingly self synchronous even though no clock signals are externally generated.

The system shown in the drawings and described above also has other important advantages. For example, the transponder 20 does not require an external source of energy since it receives its energy from the pulses generated by the coil 12. Furthermore, the reader 14 receives a minimal amount of energy since the pulses such as the pulses 32, 36 and 40 have a relatively short duration compared to the relatively long interval between successive pairs of pulses.

The system is also advantageous because it is relatively immune t extraneous noises and to small obstacles in the transmission path. This results from several factors. For example, the coils 12 and 22 are responsive only to magnetic signals emanating directly toward the openings in the cores upon which they are wound. Furthermore, the information is generated in the form of frequency modulated codes at specific frequencies such as the first and second frequencies. Another factor is that the reader 14 generates each pulse only after it has counted a particular number of signals gnerated at each of the first and second frequencies by the coil 22.

The system shown in the drawings and described above is also relatively fast. This results partly from the fact that the transponder 20 responds instantaneously to the pulses generated in the reader 14. It also result from the fact that the reader 14 responds instantaneously to the signals generated by the transponder 20. It further results from the fact that substantially all of the components in the reader 14 can be disposed on a first integrated circuit chip 101 (FIG. 10) and that this chip is of relatively small size. Another contributing factor is that substantially all of the components in the reader 14 can be disposed on an integrated circuit chip 103 (FIG. 11) and that this chip is of relatively small size.

The system described above is also quite tolerant of variations in component values. This facilitates the relative ease with which the reader 12 and the transponder 22 can be manufactured in quantity. The relative ease of manufacture is enhanced by the manufacture of the reader 14 on the integrated circuit chip 101 (FIG. 10) and the manufacture of the transponder 22 on the integrated circuit chip 103 (FIG. 11).

Although the system has been described above with reference to identifying an object, the system can be used to generate any type of information. This can be accomplished by eliminating the multiplexer 86 and introducing directly to the format generator 84 signals generated externally to the transponder in binary coded form to represent the information to be identified. Alternatively, the externally generated information can be introduced to the multiplexer 86, which stores such information and then introduces such information to the format generator 84 by operating as a shift register.

Figure 10:
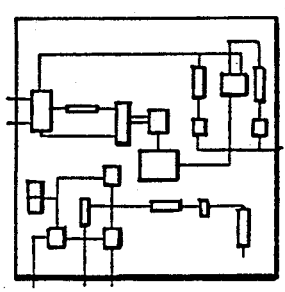
FIG. 10 schematically illustrates an integrated circuit chip which incorporates substantially all of the components of the reader.

The system shown in the drawings and described above is also advantageous because virtually all of the components in the reader can be disposed on the integrated circuit chip 101 in FIG. 10. The integrated circuit chip 101 in FIG. 10 is illustrated only schematically and can be considered to include all of the components in FIGS. 2 and 3 except for the coil 12 and, in some cases, the capacitance 54. The capacitance 54 may not be considered to be included in the integrated circuit chip 101 because it is a charging capacitor and accordingly has a relatively high value.

Figure 11:
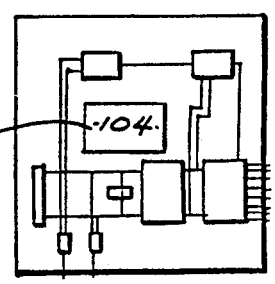
FIG. 11 schematically illustrates an integrated circuit chip which incorporates substantially all of the components of the transponder.

Similarly, virtually all of the components in the transponder 20 can be disposed on the integrated chip 103 in FIG. 11. The integrated circuit chip 103 in FIG. 11 is also illustrated schematically. All of the components shown in FIG. 4 (except for the coil 22) are included in the integrated circuit chip 103.

By disposing virtually all of the components in the reader 14 on the integrated circuit chip 101 and all of the components in the transponder 20 on the integrated circuit chip 103, the reader and the transponder can occupy minimal spaces. This allows the transponder 20 to be disposed inconspicuously on an object to be identified. It also allows the reader 14 to be carried conveniently in a pocket until it is desired to be used. The disposition of the reader 14 and the transponder 20 on integrated circuit chips also allows the reader and the transponder to be duplicated with substantially identical characteristics and to operate at relatively high frequencies.

The system described above is disclosed and claimed in application Ser. No. 840,318 (now U.S. Pat. No. 4,752,776) assigned of record to the assignee of record in the application. This system may include a read-only memory (or multiplexer 86) in which signals pre-programmed into the memory cannot be changed. The system may be also used with a programmable memory 104 in the chip 103 in FIG. 11. Under such circumstances, the memory 104 in the transponder may be preprogrammed by pulses generated in the reader and transmitted by the reader to the transponder for demodulation and decoding by the transponder and for recording by the transponder of the decoded information in the programmable memory. The programmable memory 104 may be of different types. For example, it may be an electrically programmable read-only memory, an electrically erasable programmable read-only memory or a write once-read many programmable memory. All of these are well known in the art.

Figure 12:
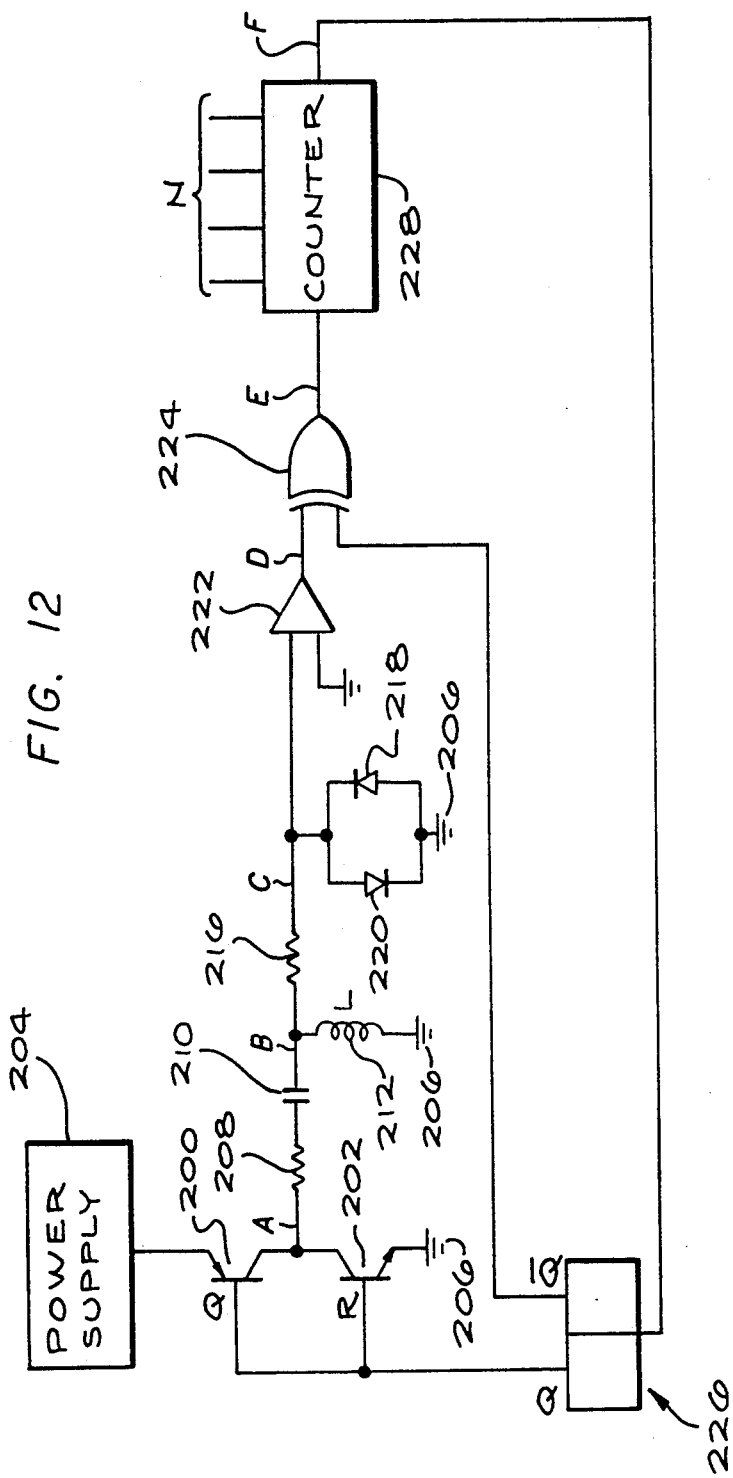
FIG. 12 is a circuit diagram, partially in block form, of one embodiment of a system at the reader for transmitting pulses to the transponder to program the programmable memory in the transponder.

A system at the reader for programming the lprogrammable information in the transponder memory 104 is shown in FIG. 12. The system shown in FIG. 12 may include a pair of transistors 200 and 202. The transistor 200 may be a pnp transistor and the transistor 202 may be an npn transistor. The emitter of the transistor 200 may receive a positive voltage from a power supply 204 and the emitter of the transistor 202 may receive a reference voltage such as a ground 206.

The collectors of the transistors 200 and 202 may be connected to a resistor 208 which is in series with a capacitance 210 (which may be the capacitance 54 in FIG. 2). A coil 212 (which may be the coil 12 in FIG. 1-3) is connected between the capacitance 210 and the reference potential such as ground. A connection is made from the ungrounded terminal of the coil 212 to one terminal of a resistance 216. The other terminal of the resistence 216 is common with the anode of a diode 218 and the cathode of a diode 220. The cathode of the diode 218 and the anode of the diode 220 are common with the reference potential such as the ground 206.

The voltage on the anode of the diode 218 and the cathode of the diode 220 is introduced to one input terminal of a comparator 222. A second input terminal of the comparator 222 receives the reference potential such as the ground 206. The output from the comparator 222 is introduced to one input terminal of an exclusive "or" network 224. A second input terminal of the exclusive "or" network 224 receives the voltage on the output terminal of one stage (designated as the "false" stage) in a bistable member such as a flip-flop generally indicated at 226.

The signals from the exclusive "or" network 224 are introduced to a counter 228. The counter 228 may be programmed at each instant to count to a particular value dependent upon the programmable item to be inserted into the programmable memory in the transponder. Upon each count of the particular count in the counter 228, a signal is introduced to the input terminals in the flip-flop 226 to trigger the flip-flop from one state of operation to the other. The output terminals of the true and false stages in the flip-flop 226 are respectively connected to the bases of the transistors 220 and 202.

FIG. 13 illustrates the sequence (or pattern) of signals produced in the reader for each different type of programmable information. In FIG. 13, the pulses move from right to left at progressive instants of time so that the most recent pulse in a sequence is at the right. For example, to program a binary "0" in the programmable memory in the transponder, a sequence of signals generally indicated at 230 is produced. This sequence includes a first pair of pulses 231a and 231b alternately with positive and negative polarities. The sequence also includes a second pair of pulses 230a and 230b of positive and negative polarities. The second pair of pulses 231a and 231b indicates that programmable information is contained in the preceeding sequence. The preceeding pair of pulses 231a and 231b indicates a binary "0".

In like manner, a binary "1" is indicated in FIG. 13 by a second pair of pulses 233a and 233b alternately of positive and negative polarities. This indicates that signals representing a programmable item is contained in the preceeding sequence. The programmable item constituting a binary "1" is indicated by a pair of pulses 234a and 234b, both of negative polarity. The pulses of positive and negative polarity preceeded by two pulses of negative polarity are generally indicated at 235 in FIG. 13.

A sequence of pulses to initialize a code sequence identified as "Reset" is generally indicated at 236 in FIG. 13. This sequence includes a pair of pulses 237a and 237b, first of positive polarity and then of negative polarity, to indicate that a programmable item is contained in the preceeding sequence. This pair of pulses follows a single pulse 238a of positive polarity. When a programmable item constituting a reset is produced, it may indicate that the following sequences individually represent binary "1's" and binary "0's" to be programmed into the memory 104 (FIG. 11).

The system shown in FIG. 12 operates to produce the sequences of pulses indicated at 230, 235 and 236 in FIG. 13. When the flip-flop 226 is in the false state of operation, a voltage of relatively low polarity is introduced to the base of the transistor 200 to make the transistor conductive. A pulse of current accordingly flows through a circuit including the power supply 204, the transistor 200, the resistance 208, the capacitance 210 and the coil 212 to charge the capacitance. This current produces a voltage pulse, such as a pulse 240 in FIG. 14, in the coil 212. The coil 212 is coupled to the transponder which incorporates a tuned circuit so as to produce ringing signals as indicated at 244 in FIG. 14.

When the true state of the flip-flop 226 becomes operative, voltage of a relatively high polarity is produced on the output terminal of the left stage in the flip-flop. This causes the transistor 202 to become conductive. The capacitance 210 accordingly discharges through a circuit including the capacitance, the resistance 208, the transistor 202 and the coil 212. This flow of current produces a pulse of a negative polarity in the coil 212, as indicated at 242 in FIG. 14. This pulse is followed by ringing signals as indicated at 246 in FIG. 14.

The diode 218 operates to limit the amplitude of the positive pulses, such as the pulse 240, produced by the coil 212 and the diode 220 operates to limit the amplitude of the pulses of negative polarity, such as the pulse 242, produced by the coil. The pulses of limited amplitude are indicated at 247 in FIG. 14. Because of this limitation in the amplitude of the pulses such as the pulses 240 and 242, the amplitudes of the ringing signals 244 and 246 more nearly approach those of the pulses 240 and 242.

The pulses, such as the pulses 247, of limited amplitude are introduced to the comparator 222 which operates to saturate the pulses such as the pulses 240 and 242 and the ringing signals such as the ringing signals 244 and 246. The resultant pulses from the comparator 222 are as indicated at 248 in FIG. 14. As will be appreciated, all of the pulses now have substantially the same amplitude.

The saturated pulses from the comparator 222 and the voltage on the output terminal of the false stage in the flip-flop 226 are introduced to the exclusive "or" network 224. The network 224 is constructed in a conventional manner to pass a pulse only when one of the input voltages introduced to the network is low and the other input voltage introduced to the network is high. The pulses passing through the exclusive "or" network 224 are indicated at 250 in FIG. 14.

The pulses passing through the network 224 are introduced to the counter 228. As will be seen from the subsequent discussion, the counter 228 is set at each instant to count to a value dependent upon the programming operation at that instant. When the particular count is reached in the counter 228, the counter becomes reset to start a new count. This causes a triggering signal to be introduced to the flip-flop 226 to set the flip-flop from its previous state of operation to the other state of operation. The triggering signals introduced to the flip-flop 226 are indicated at 252 in FIG. 14.

Figure 14:
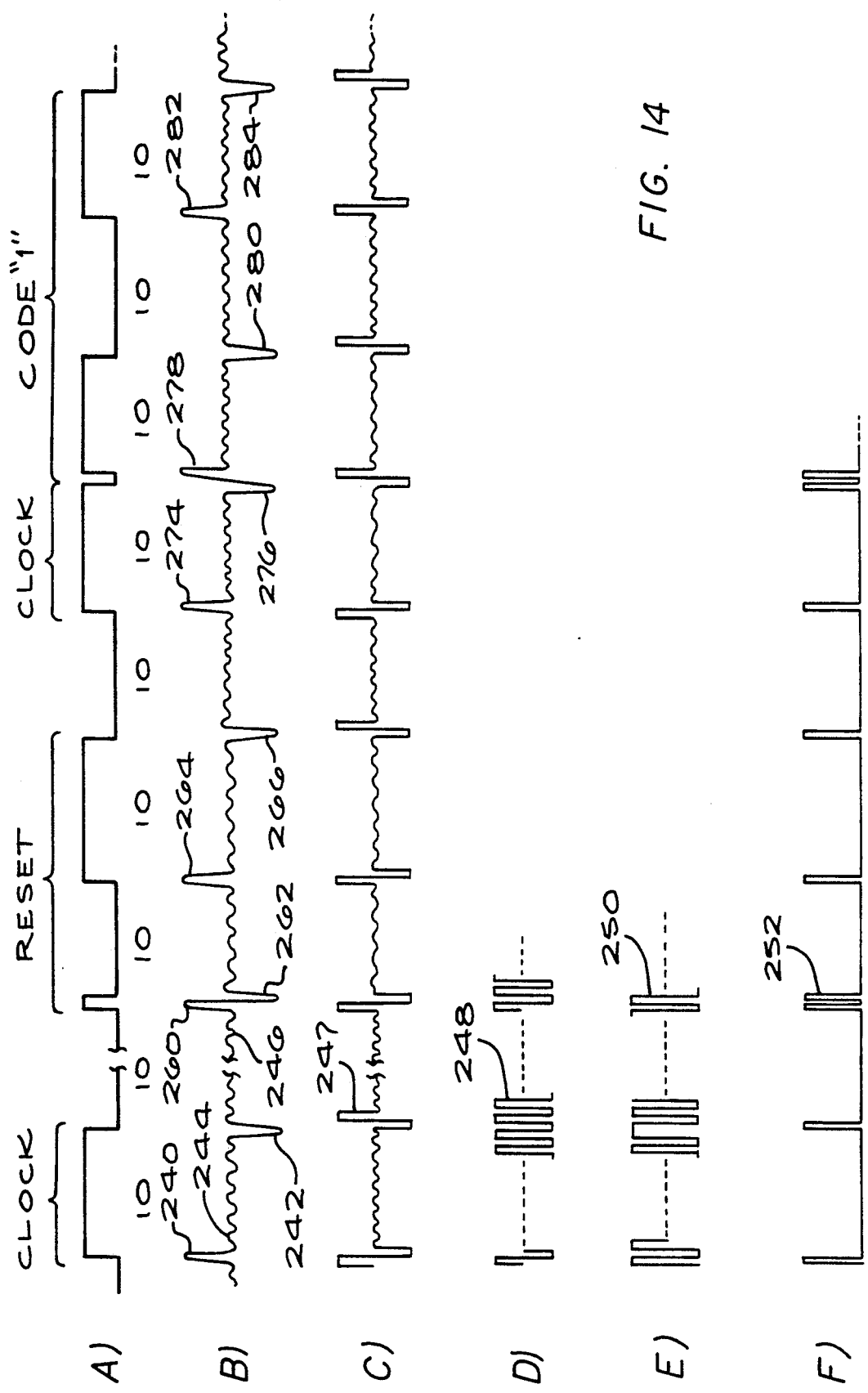
FIG. 14 illustrates the voltages produced at strategic terminals in the system of FIG. 12 when the system is operating to program a particular sequence of programmable items into the memory at the transponder.

In the representations shown in FIG. 14, the first pulse in a sequence appears at the left and successive pulses appear progressively toward the right. In FIG. 14, the pulses 240 and 242 constitute a pair for synchronizing the operation of the system shown in FIG. 12. These pulses are separated by a particular number such as ten (10) ringing cycles. A reset is then programmed by the production of pulses 260, 262, 264 and 266. The pulses 264 and 266 indicate that a programming item is contained in the preceeding pulses in time and the pulse 260 indicates that the programming item constitutes a reset. The pulses 260 and 262 provide such an indication since there is the particular separation of one (1) ringing cycles between these two (2) pulses. In this way, only the pulse 260 is considered at the transponder in providing the initialization reset and the pulse 262 is disregarded at the transponder.

In like manner, pulses such as the pulses 282 and 284 separated by the particular number such as ten (10) ringing cycles and having opposite polarities indicate that a programming item is contained in the preceeding pulses. This programmable item is indicated by pulses 276, 278 and 280. The pulses 276 and 280 are separated by the particular number such as ten (10) clock signals to indicate that the programmable item is a binary "1". The pulse 278 is accordingly disregarded at the transponder in a manner similar to the way that the transponder disregards the pulse 262 in the previous paragraph.

In FIG. 14, the pulses 264 and 266 also represent a binary "0". The reason is that the pulses 264 and 266 are followed by the pulses 274 and 276 respectively having a positive and negative polarity. Thus, as will be seen it is not necessary to send a separate pair of pulses for each programmable item, such as the pulses 264 and 266, respectively having positive and negative polarities. Specifically, the pulses 264 and 266 indicate that a reset is represented by the pulses 260. The pulses 264 and 266 also represent a binary "0" since they are followed by the pulses 274 and 276.

In considering FIG. 12 in relation to FIG. 14, it will be seen that the letter "A" through "F" are shown at strategic terminals in FIG. 12. The voltages or signals produced at these terminals are shown in the rows "A" through "F" in FIG. 14. FIG. 14 also indicates the value for the letter "N" indicated in FIG. 12. This indicates a preselected number of ringing cycles to be produced at each instant.

Figure 15:
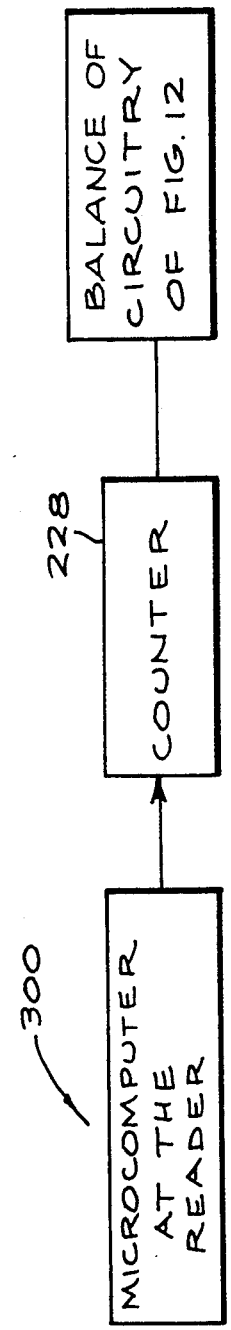
FIG. 15 is a schematic circuit diagram illustrating how an identifying code for a transponder is produced at the reader.

FIG. 15 is a schematic diagram of how the system shown in FIG. 14 operates at the reader to obtain the generation by the circuitry shown in FIG. 12 of the patterns of signals for programming the programmable memory 104 at the transponder. The system shown in FIG. 15 includes a microcomputer 300 which generates an individual code to be recorded in the memory 104 at the transponder 20 in FIG. 1. This code controls at each instant the count N to be provided in the counter 28 (also shown in FIG. 12). As will be appreciated, every time that a count N determined by the microcomputer 300 has been completed, a signal is introduced from the counter to the flip-flop, 226 in FIG. 12 to obtain the generation of a pulse which is transmitted by the coil 212 to the transponder 20 in FIG. 1.

FIG. 16 schematically illustrates a system at the transponder 20 for demodulating and detecting the programming pulses from the reader 12. The programming pulses from the reader 12 are received by a coil 302 at the transponder 20. The coil 302 may be the same as the coil 22 in FIG. 1. The pulses in the coil 302 are introduced to a clock separator 304 which determines whether a pulse is derived from a positive or negative signal in the coil 302. The positive pulses from the clock separator 304 are introduced on one line to a shift register 306 and the negative pulses are introduced on another line to the shift register. The pulses representing each programmable item are then shifted through the shift register 306 to obtain an identification of the programmable item (e.g. binary "1", binary "0" and reset) in accordance with the relative polarities of the pulses in the shift register 306. This identification is provided by a decoder 308 in accordance with a truth table in FIG. 17. The programmable items (e.g. binary "1" or binary "0") may then be recorded in the appropriate positions in the programmable memory 104. It will be appreciated that the clock separator 304, the shift register 306 and the decoder 308 may be included in a microprocessing unit at the transponder 20.

FIG. 17 constitutes a table illustrating how signals are produced in the shift register 306 for the different programmable items constituting a binary "1", a binary "0" and a reset. In FIG. 17, the successive stages in the shift register 306 are respectively illustrated at A, B, C and D to correspond to the designations for the shift registers in FIG. 16. As will be seen, the signals are shifted progressively from the stage A to the stage B, then to the stage C and finally to the stage D. The decoder 308 examines the four (4) signals in parallel in the stages A, B, C and D in the shift register 306. A negative signal in the stage A and a positive signal in the stage B indicate that a programmable item is represented by the signals in the stages C and D. A positive signal in the stage C indicates a reset. When a reset is produced, this indicates that the following individual sequences represent binary "1's" or binary "0's" which may be recorded in the programmable memory 104 (FIG. 11) in a pattern represented by such signals. Two negative signals in the stages C and D represent a binary "1". A positive signal in the state C and a negative signal in the stage D represent a binary "0". as will be seen, the system shown in FIG. 16 demodulates and detects the programming pulses from the reader 12 and records the detected program in the programmable memory 104 in FIG. 11. This program is represented by a unique series of binary "1"' and binary "0"' to identify an individual object. This programmable memory 104 can be included in the transponder 20 shown in FIG. 4. The system shown in FIGS. 1-4 is accordingly able to operate in the manner described above so that the reader 14 in FIG. 1 can identify the unique code in the programmable memory 104 in the transponder 20 for the purpose of determining whether the individual object identified by this unique code is the object that it is seeking.

It will be appreciated that the count N in the counter 58 in FIG. 2 (or the count N in the counter 228 in FIG. 12) is always a particular number such as "10" when the reader operates to identify a particular code in the multiplexer (or fixed memory) 86 of FIG. 4 or the programmable memory 104 in FIG. 11. However, the count in the counter 228 in FIG. 12 may sometimes be the number "1" and at other times the number "10" in accordance with the operation of the microcomputer 300 (FIG. 15) when the memory 104 is being programmed. This may be seen in FIG. 14B where the pulses 240 and 242 are separated by ten (10) counts and the pulses 260 and 262 are separated by only one (1) count.

The apparatus disclosed above and shown in FIGS. 12-16 has certain important advantages. One advantage is that it is able to program the memory 104 in the transponder 20 by using the same types of pulse transmission as are used subsequently in identifying the transponder in accordance with the operation of the circuitry and apparatus shown in FIGS. 1-6.

Another advantage to the programming system and method of this invention is that the communication between the reader an the transponder is substantially foolproof during the programming of the transponder. This results in part from the characteristics of the coils 12 and 22 as shown in FIGS. 5 and 6. I also results in part from the inclusion of the pair of pulses of opposite polarity following the pair of pulses identifying each programmable item. By including this pair of pulses, the transponder is able to identify that the preceeding pair of pulses represents a programmable item and is able to identify such programmable item from such preceeding pair of pulses.

There is another important advantage to the programming system and method of this invention. This results from the fact that the programming pulses are produced on a self synchronizing basis at the reader and that the pulses are produced after particular counts in the counter 228. This facilitates the identification and decoding of the programming pulses at the transponder 20.

The programming is also relatively fast. This results in part from the use of integrated circuit chips for the reader 12 and the transponder 20. It also results in part from the generation of the programming pulses at the reader 12 in accordance with the counts provided in the counter 228.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

I claim:

1. In a system including a transponder and a reader for providing for the generation by the transponder of information individually identifying the transponder to the reader, means at the reader for generating first, second and third pulses and for generating related pulses, each of the first, second and third pulses being respectively indicative of a related generation of pulses individually representing a binary "1", a binary "0" or a reset, the related pulses being indicative of the position of the generation of the first, second and third pulses, means responsive at the reader to the generation of the first, second and third pulses and the related pulses for generating a first individual sequence of signals representative of a binary "0", a second individual sequence of signals representative of a binary "1" and a third individual sequence of signals representative of a reset and additional sequences of signals indicative of the position of generation of the first, second and third sequences of signals, means for providing a programmable memory at the transponder, and means responsive at the transponder to the generation of each of the first, second and third individual sequences of signals in a particular pattern and the additional sequences of signals for programming the programmable memory in the transponder to record binary "1's" and binary "0's" in an individual pattern in accordance with the pattern of the first, second and third individual sequences of signals generated by the reader.

2. In a system as set forth in claim 1, means at the reader for programming the reader to generate the first, second and third individual sequences of signals in the particular pattern and the additional sequences of signals to obtain the recording of the binary "1's" and binary "0's" in the programmable memory in the transponder in the individual pattern.

3. In a system as set forth in claim 2, means at the transponder for programming the programmable memory in the transponder to respond to the first, second and third individual sequences of signals and the additional sequences of signals to obtain the recording of the binary "1's" and binary "0's" in the programmable memory in the transponder in the individual pattern.

4. In a system as set forth in claim 1, wherein the generating means at the reader generates a first pair of pulses of alternate polarity to represent a binary "0", a second pair of pulses of a first polarity to represent a binary "1" and at least one pulse of a second polarity opposite to the first polarity to represent a reset, and wherein the generating means at the reader generates a pair of additional pulses of alternate polarity at a particular time relative to the pulses indicating the binary "0", the binary "1" and the reset to identify the generation of the pulses indicating the binary "0", the binary "1" and the reset.

5. In a system including a transponder and a reader for providing for the generation by the transponder of information individually identifying the transponder to the reader, means at the reader for providing a code in which the transponder is to be programmed, a programmable memory at the transponder, means at the reader for producing positive and negative coding pulses in a pattern dependent upon the code in which the memory at the transponder is to be programmed and for producing additional positive and negative pulses in a pattern indicating the position of the coding pulses, means at the reader for producing, between the successive pairs of pulses in the coding and additional pulses, sequences of signals in a pattern dependent upon the pattern of the production of the positive and negative pulses in the coding and additional pulses, means at the reader for transmitting the sequences of the signals to the transponder.

6. In a system as set forth in claim 5, means at the transponder for decoding the pattern of the sequences of signals, and means for recording the decoded information in the programmable memory at the transponder.

7. In a system as set forth in claim 5 wherein the means at the reader for producing the pattern of the positive and negative coding pulses and the additional pulses include a coil and a capacitance connected to the coil and means for alternately providing for a storage of energy in the capacitance to generate pulses in the coil of the positive polarity and a discharge of such stored energy from the capacitance to generate pulses in the coil of the negative polarity.

8. In a system as set forth in claim 7 wherein the means at the reader for producing the pattern of the positive and negative coding pulses and the additional pulses include bistable means having first and second states of operation and a counter for counting the signals in each sequence wherein the bistable means are responsive to the beginning and end of each successive count of a sequence in the counter to become triggered to the opposite state of operation relative to its previous state of operation.

9. In a system as set forth in claim 8, the means at the reader for producing the pattern of the positive and negative coding pulses and the additional pulses further including means responsive to the operation of the bistable means in the first state for providing the storage of energy in the capacitance through a circuit including the coil to generate the pulses of the positive polarity in the coil and responsive to the operation of the bistable means in the second state for providing for the discharge of the energy in the capacitance through the coil to generate the pulses of the negative polarity in the coil.

10. In a system including a transponder and a reader for programming a programmable memory in the transponder to generate coded information individually identifying the transponder to the reader, means at the reader for generating signals in sequences of first and second opposite phases, means at the reader for providing a count of the signals generated at the reader in each of the sequences of the first and second opposite phases, means at the reader for controlling the count to be provided at each instant in the counting means, in accordance with the code to be provided for the transponder, of the signals generated at the reader in each sequence to control at each instant the number of signals generated at the reader to complete such sequence, means responsive at the reader to each initiation of a sequence for producing signals of one of the first and second opposite phases and responsive to each completion of such sequence for generating signals of the other one of the first and second opposite phases in the next sequence, and means at the reader for providing for the transmission of the signals in the sequences of the first and second opposite phases to the transponder to provide for the programming of the code in the programmable memory in transponder.

11. In a system as set forth in claim 10, the controlling means providing for an individual count in the counting means at each instant, in accordance with the code to be programmed into the programmable memory in the transponder at that instant, of the signals generated in the sequence at the reader.

12. In a system as set forth in claim 10, the signal generating means including a coil for alternately generating the signals in the sequences of the first and second opposite phases in accordance with the count in the counter.

13. In a system as set forth in claim 12, the signal generating means including bistable means having first and second stakes of operation and including a capacitance and operative in the first state to provide for the introduction of energy into the capacitance through the coil and operative in the second state to provide for the transfer of energy from the capacitance through the coil.

14. In a system as set forth in claim 13, means at the transponder for receiving the signals transmitted from the reader in each sequence, means at the transponder for decoding the received signals in each sequence, in accordance with the phases and the count of the signals in such sequence, to recover the code represented by such signals, and means at the transponder for recording the recovered code in the programmable memory at the transponder.

15. In a system including a transponder and a reader for providing for the generation by the transponder of coded information individually identifying the transponder to the reader, the reader being operative to transmit coded pulses to identify a binary "1", a binary "0" and a reset and to transmit pulses indicating the position of the coded pulses, means at the transponder for receiving the coded and identifying pulses transmitted by the reader, means at the transponder for operating upon the received pulses to recover the coded pulses in accordance with the identification of the position of the coded pulses by the identifying pulses, means responsive at the transponder to the recovered coded pulses for decoding the coded pulses to recover the coded information, a programmable memory at the transponder, and means for recording the coded information in the programmable memory at the transponder.

16. In a combination as set forth in claim 15, demodulating means at the transponder for identifying the identifying pulses and for operating upon the identifying pulses to determine the positions of the coded pulses.

17. In a combination as set forth in claim 16, the coded pulses having an individual sequence of pulses of first and second opposite polarities and the identifying pulses having an individual sequence of pulses of the first and second opposite polarities and the decoding means being operative to detect the polarities of the successive pulses in the sequences to recover the decoded information.

18. In a system including a reader and a transponder for providing for the generation by the transponder of information individually identifying the transponder to the reader, means at the reader for generating first and second sequences of signals in a pattern dependent upon a particular code to identify successive programmable items and for transmitting the first and second sequences of signals to the transponder, each of the first sequences having a particular number of signals and having a phase dependent upon the programmable item being coded by such sequence in the particular code, each of the second sequences identifying the positions of the first sequences, a programmable memory at the transponder, means at the transponder for receiving the first and second sequences of signals and for identifying the positions of the first sequences from the second sequences and for decoding the first sequences of signals and for recording in the programmable memory the particular code identified by the first sequences of signals, means at the reader for generating interrogating pulses and transmitting the interrogating pulses to the transponder, means responsive at the transponder to the interrogating pulses for producing and transmitting third sequences of signals at first and second frequencies in a pattern indicative of the particular code recorded in the programmable memory, means responsive at the reader to the third sequences of signals at the first and second frequencies for providing for the continued generation and transmission of the interrogating pulses, and means responsive at the reader to the third sequences of the signals at the first and second frequencies for decoding such signals to identify the code in the programmable memory at the transponder.

19. In a system as set forth in claim 18, the generating means at the reader for the first and second sequences of signals including a capacitance and a coil and means for alternately charging and discharging the capacitance through the coil, the generating means at the reader for the interrogating pulses including the capacitance and the coil and means for alternately charging and discharging the capacitance through the coil, the coil providing the transmission of the first and second sequences of the signals from the reader to the transponder.

20. In a system as set forth in claim 18, the generating means at the reader for the first and second sequences of signals including means for generating first pulses in a pattern identifying the programmable items and second pulses in a pattern identifying the positions of the first pulses and including means for respectively converting the first and second pulses into the first and second sequences of signals, the decoding means at the transponder for the first and second sequences of signals being operative to demodulate the first and second sequences to recover the first and second pulses and being operative to decode the demodulated pulses to recover the code which is to be recorded in the programmable memory.

21. In a system as set forth in claim 20, the generating means at the reader for generating the interrogating pulses alternately producing pulses of first and second opposite polarities, and the means at the transponder for producing the third sequences of the signals at the first and second frequencies being responsive to the polarity of the pulses from the reader and to the code recorded in the programmable memory to produce one of the third sequences of signals at a particular one of the first and second frequencies and then another one of the second sequences of signals at the other one of the first and second frequencies to identify each of the successive programmable items in the code.

22. In a system as set forth in claim 21, the generating means for the interrogating pulses and the first and second pulses and the first and second sequences of signals including a capacitance and a coil and means for alternately charging and discharging the capacitance through the coil, the coil providing for the transmission of the interrogating pulses and the first and second sequences of signals from the reader to the transponder and a coil at the transponder in magnetically coupled relationship with the coil at the reader to receive the interrogating pulses and the first and second sequences of signals.

23. In a system including a transponder and a reader for providing for the generation by the transponder of information individually identifying the transponder to the reader, means at the reader for alternately generating pulses of first and second opposite polarities, means operatively coupled at the reader to the generating means for obtaining the generation by the generating means of the pulses alternately of the first and second opposite polarities in a sequential code identifying a plurality of programmable items, the sequential code for each programmable item including pulses identifying the particular pulses programming such programmable item, means operatively coupled at the reader to the generating means and responsive to the alternate generation of the pulses of the first and second opposite polarities for generating sequences of signals of first and second opposite phases, means for transmitting the sequences of signals of the first and second opposite phases to the transponder for reception by the transponder, a programmable memory in the transponder, means at the transponder for demodulating the received sequences of signals to recover the particular pulses programming each programmable item from the pulses identifying such particular pulses in the sequential code, means at the transponder for decoding the pulses coding for each programmable item and recording the decoded information in the programmable memory in a sequential code, means at the reader for thereafter producing alternately pulses of opposite polarities to interrogate the transponder for the sequential code in the programmable memory, means responsive at the transponder to the interrogating pulses alternately of opposite polarities and to the sequential code in the programmable memory for producing a particular number of signals initially of a first frequency and subsequently of a second frequency for each programmable item, the order of the signals at the first and second frequencies for each programmable item being dependent upon the order in the polarity of the interrogating pulses and the identity of the programmable item, means responsive at the reader to each generation of a particular number of signals at each of the first and second frequencies by the transponder for providing for the generation at the reader of an interrogating pulse of a polarity opposite to the polarity of the interrogating pulse previously generated at the reader, and means at the reader for detecting the signals at the first and second frequencies to identify the sequential code in the programmable memory at the transponder.

24. In a system as set forth in claim 23, the means at the reader for generating the interrogating pulses including a counter for counting the signals generated at the transponder at each of the first and second frequencies and for generating the next interrogating pulse upon each occurrence of a particular count in the counter, the means at the reader for obtaining the generation of the pulses in the coded sequence also including the counter and the counter being operative to count to the particular count to generate the successive pulses in the coded sequence.

25. In a combination as set forth in claim 24, bistable means disposed at the reader and having first and second states of operation, a counter at the reader, means disposed at the reader and responsive to each count to the particular value in the counter for triggering the bistable means from one of the first and second state of operation to the other of the first and second states of operation, a capacitance at the reader, a coil at the reader, means responsive at the reader to alternate triggerings of the bistable means to produce a flow of current through the capacitance and the coil in a direction to charge the capacitance and produce a voltage pulse of the first polarity in the coil, and means responsive at the reader to the other triggerings of the bistable means to reproduce a flow of current through the capacitance and the coil in a direction to discharge the capacitance and produce a voltage pulse of the second polarity in the coil.

26. In a system as set forth in claim 25, switching means disposed at the transponder and having open and closed states of operation, a first capacitance at the transponder, a second capacitance at the transponder, a coil disposed at the transponder in magnetically coupled relationship with the coil at the reader, the coil at the transponder and the first capacitance being connected at the transponder to define a resonant circuit at the first frequency with the switching means in the open state and the coil and first and second capacitance being connected at the transponder to define a resonant circuit at the second frequency with the switching means in the closed state, the switching means being operative in the open and closed states in accordance with the polarity of the interrogating pulses and the code in the programmable memory.

27. In combination for identifying an object, a reader disposed at a first position, a transponder disposed at a second position displaced from the position, means for coupling energy between the reader and the transponder, means in the reader for producing interrogating pulses to initiate a sequence of cyclic interactions of energy between the reader and the transponder, a programmable memory in the transponder for providing a binary code including a plurality of programmable items in a particular sequence identifying the object, means responsive at the transponder to the interrogating pulses from the reader for producing in each of the cyclic interactions signals having each of first and second frequencies in a sequence dependent upon the programmable item being identified in the programmable memory in the transponder, means responsive at the reader to the signals produced by the transponder at an individual one of the first and second frequencies in each of the cyclic interactions for producing an interrogating pulse in the coupling means to initiate in the transponder the production of the signals in the other one of the first and second frequencies in the cyclic interactions, means at the reader for providing for the production of first pulses in a pattern for programming the binary code in the programmable memory in the transponder and second pulses in a pattern for identifying the positions of the first pulses, and means at the transponder for identifying the first pulse in accordance with the pattern of the second pulses and for decoding the first pulses in the pattern programming the binary code and for recording the binary code in the programmable memory in the transponder in accordance with such decoding.

28. In a system as set forth in claim 27, means at the reader for alternately producing the interrogating pulses with first and second opposite polarities, the pulse producing means being operative at the reader during the identification of the transponder to produce an interrogating pulse of an opposite polarity from the previous interrogating pulse upon the reception of the signals in the sequences from the transponder at each of the first and second frequencies, the pulse producing means being operative at the reader during the programming of the transponder in the binary code identifying the object to produce the first and second pulses with opposite polarities in patterns individually indicative of the different programmable items in the particular sequence.

29. In a system as set forth in claim 28, the signal-producing means at the transponder being responsive to the polarities of the interrogating pulses from the reader and the binary code in the programmable memory for producing in each cycle of interactions the signals at the first and second frequencies in a particular order indicative of such pulses, the programmable items including a binary "1", a binary "0" and a reset, the pulse producing means at the reader producing, during the programming of the memory in the transponder, for each programmable item a pulse sequence including the first pulses having particular patterns individual to the binary "1", the binary "0" and the reset in the programmable items and including the second pulses identifying the first pulses as being individual to the programmable items, the decoding means at the transponder being operable to identify the first pulses in each pulse sequence in accordance with the occurrence of the second pulses in such pulse sequence and to decode the first pulses in each pulse sequence in accordance with the pattern of the first pulses to obtain the binary code for the programmable items represented by such first pulses and to record the binary code for the programmable items in the programmable memory in the transponder.

30. In a system as set forth in claim 29, the coupling means being magnetic and including a first coil at the reader and a second coil at the transponder and the first and second coils being in magnetically coupled relationship to each other and the pulse producing means at the reader including the first coil and a capacitance and bistable means having first and second states of operation and operative in the first state to produce a flow of current through the capacitance and the first coil in a direction for charging the capacitance and for producing a pulse of a first polarity in the coil and operative in the second state to produce a flow of current through the capacitance and the first coil in a direction for discharging the capacitance and for producing a pulse of a second polarity in the coil, the means at the reader for producing the interrogating pulses being operative upon each reception of a particular number of signals at each of the first and second frequencies from the transponder during the identification of the transponder at the reader for producing a pulse at the reader of the opposite polarity from that previously produced.

31. In a system including a reader and a transponder for providing for the generation by the transponder of coded information in a sequence of programmable items individually identifying the transponder to the reader, means at the reader for generating signals in sequence of first and second opposite phases to identify the plurality of sequences in which first sequences in the plurality identify that such programmable item is being coded by the sequences in the plurality and in which second sequences in the plurality identify the programmable item, means at the reader for providing a count of the signals generated at the reader in each of the sequences of the first and second opposite phases, means at the reader for controlling the count to be provided at each instant in the counting means, in accordance with the code to be provided for the transponder, of the signals generated at the reader in each sequence to control at each instant the number of signals generated at the reader to complete each sequence, and means responsive at the reader to each initiation of a sequence for producing signals of one of the first and second opposite phases and responsive to each completion of such sequence for generating signals of the other one of the first and second phases.

32. In a system as set forth in claim 31, means at the reader for transmitting the sequences of signals to the transponder, means at the transponder for receiving the signals transmitted by the reader, means responsive at the transponder to the transmitted signals for detecting a plurality of successive sequences of signals to decode such sequences, in accordance with the individual patterns of the phases in such successive sequences, to recover the programmable items, a programmable memory at the transponder, and means for recording the programmable items in the programmable memory.

33. In a system as set forth in claim 32, the detector means at the transponder including:

a separator for separating the signals in each sequence from the signals in the adjacent sequences in accordance with the phases of the signals in such sequences, a shift register including a plurality of stages and responsive to the separated signals form the separator for passing such signals sequentially through the successive stages in the shift register, and a decoder for recovering the programmable items in accordance with the pattern of the signals produced at successive instants of time in the stages in the shift register.

34. In a system as set forth in claim 31, computer means at the reader for storing the sequence of programmable items, the signal generating means being responsive at the reader to the programmable items stored in the computer means for generating the sequences of signals of first and second opposite phases, and means at the reader for transmitting the sequences of signals to the transponder.

35. In a system including a reader and transponder for providing the generation by the transponder of coded information in a sequence of programmable items individually identifying the transponder to the reader, the reader generating signals in sequences of first and second opposite phases to identify the programmable items, each programmable item being identified by a plurality of sequences in which first sequences in the plurality identify that such programmable item is being coded by the sequences in the plurality in which second sequences in the plurality identify the programmable item, means at the transponder for receiving the sequences of signals generated by the reader, means at the transponder for separating the sequences in accordance with the phases of the signals in the sequences, means responsive at the transponder to the separated signals for providing a parallel representation of the phases of the sequences of signals generated at the reader for each programmable item, means responsive to the parallel representation for recovering the programmable items, a programmable memory at the transponder, and means at the transponder for recording the programmable items in the programmable memory.

36. In a system as set forth in claim 35, the means including the parallel representation including a shift register with a plurality of stages, and the means for recovering the programmable items including a detector for determining the patterns of the signals in the stages in the shift register.

37. In a system as set forth in claim 36, the sequences of signals generated at the reader for each programmable item including first sequences of signals identifying the programmable item and second sequences of signals distinguishing the first sequences of signals as identifying the programmable item, the plurality of stages in the means for providing the parallel representation indicating the phases of the signals in the first and second sequences for each programmable item, and the recovering means including detector means for determining the patterns of the signals in the stages in the means for providing the parallel representation.

38. In a system as set forth in claim 35, the plurality of stages being included in a shift register for receiving the signals sequentially from the register and for passing the signals sequentially through the successive stages in the plurality and for providing a parallel indication of the signals in the stages to the recovering means.

* * * * *